United States Patent [19]
Vulih et al.

[11] Patent Number: 5,942,677
[45] Date of Patent: Aug. 24, 1999

[54] KNOCK SENSOR SYSTEM FOR DETECTING AND RESPONDING TO A DISCONNECT CONDITION

[75] Inventors: Salomon Vulih, Neshanic St.; Stephen J. Glica, Somerset; Harold Allen Wittlinger, Pennington, all of N.J.

[73] Assignee: Harris Corporation, Melbourne, Fla.

[21] Appl. No.: 08/931,340

[22] Filed: Sep. 16, 1997

[51] Int. Cl.$^6$ .................................................. G01L 23/22
[52] U.S. Cl. .......................................... 73/35.03; 73/1.82
[58] Field of Search ............................... 73/35.01, 35.03, 73/35.05, 35.06, 1.82

[56] References Cited

U.S. PATENT DOCUMENTS

| | | | |
|---|---|---|---|
| 4,320,729 | 3/1982 | Sawada et al. | 73/35.01 |
| 4,495,918 | 1/1985 | Sugiura et al. | 73/35.05 |
| 5,070,843 | 12/1991 | Komurasaki | 73/1.82 |

*Primary Examiner*—John E. Chapman
*Attorney, Agent, or Firm*—Henrgy I. Schanzer

[57] ABSTRACT

Signals generated by a knock sensor are coupled to an electronic network for amplifying and processing the output signals of the knock sensor. The electronic network includes a device for charging a storage capacitor to a potential which is a function of the amplitude of the knock sensor output signal. The storage capacitor is coupled to the input of an amplifier via a normally closed first switch. A detector for sensing any disconnection of the knock sensor from the electronic system produces a control signal indicative of a disconnect condition. The control signal is used to open the normally closed first switch and to cause the input of the amplifier to be clamped to a reference potential which lies outside the signal range normally produced across the storage capacitor whereby the output of the output of the amplifier is placed at a predetermined level indicative of a disconnect condition. The amplifier thus produces signals at its output which are within a predetermined range during normal operation and a signal outside of this range in response to a knock sensor disconnect condition. Thus, a single line from the output amplifier carries regular normal signals and the disconnect signal lying outside the range of the normal signals.

8 Claims, 4 Drawing Sheets ic signals (ek) in response
KNOCK SENSOR SYSTEM FOR DETECTING AND RESPONDING TO A DISCONNECT CONDITION

BACKGROUND OF THE INVENTION

This invention relates to a knock sensor system and, in particular, to a knock sensor system including circuitry for detecting and responding to a knock sensor disconnect condition.

FIG. 1 shows a system designed to sense the premature detonation ("knock") of an engine and means for generating signals to correct for the knock. A knock sensor 10, which may generally be a microphone (or a piezoelectric device, as shown in FIG. 2) and which is located on or near an automobile engine, produces a knock signal (ek) in response to the "knocking" of the engine. The knock sensor 10 is connected via line 101, which may be relatively long, to an electronic system 3 mounted on a printed circuit board (PCB). The electronic system 3 comprises an integrated circuit (IC) 5, also referred to as a chip, and a microprocessor 29. As described below, the chip 5 contains circuitry for processing and amplifying signals produced by knock sensor 10 and coupled to the chip via line 101. The signals (ek) derived from the sensor 10 are applied to an amplifier 12 whose output is applied to the input of an anti-aliasing filter 13 whose output is applied to the input of a programmable gain stage 14. In response to the knock signal ek the programmable gain stage 14 produces at its output an in-phase signal (ek1) and an out-of-phase signal (ek1b). The signal ek1 is applied to a bandpass filter 16a and the signal ek1b is applied to a bandpass filter 16b. The output of filter 16a produces a signal identified as $V_{IN}$ and the output of filter 16b produces a signal identified as $V_{INB}$. Theoretically, in-phase signal $V_{IN}$ should be the exact complement (or inverse) of the out-of-phase signal $V_{INB}$. Input signals $V_{IN}$ and $V_{INB}$ are then applied to a rectifier section 18 which controls the application of the signals $V_{IN}$ and $V_{INB}$ to an integrator 20. Integrator 20 includes a positive signal integrator 20a and a negative signal integrator 20b. The rectifying circuit 18 includes circuitry for comparing $V_{IN}$ and $V_{INB}$ and switches for enabling the positive going portion of signals $V_{IN}$ and $V_{INB}$ to be applied to integrator 20a and the negative going portion of signals $V_{IN}$ and $V_{INB}$ to be applied to integrator 20b. As a result, the outputs of integrators 20a and 20b function to increase the positive and negative amplitude of the knock signal over selected integrating intervals.

The outputs of integrators 20a and 20b are fed to a differential to single-ended amplifier 22 whose output charges a storage capacitor C24. The voltage developed across capacitor 24 is applied to and drives a buffer 26 having an output 27 which is fed to microprocessor 29 which further processes the output voltage from the capacitor 24 to control (reduce) the engine knock.

A problem exists when the knock sensor is disconnected from the circuit. When a disconnect condition exists, noise signals at the input of the amplifier 12 and other signals picked up by the system may produce false "knock" signals which may be fed to the microprocessor 29 and disable the engine at an inopportune time. It is therefore desirable to sense a knock sensor disconnect condition and in response thereto prevent the knock sensor electronic system from supplying potentially dangerous signals.

It is therefore an object of this invention to sense a knock sensor disconnect condition and, in accordance thereto, prevent the electronic system from interfering with the operation of the engine. However, generating and distributing a signal to prevent the electronic system from interfering with the engine operation, normally requires that at least one special line be run. Where the electronic system responsive to the knock signals is built on a chip mounted on a printed circuit board, all the pins of the chip/package may be dedicated for specific uses. It is therefore undesirable and/or problematic to produce a separate output requiring a pin/terminal of the chip and/or package.

SUMMARY OF THE INVENTION

A system embodying the invention includes a knock sensor whose output is coupled to an electronic network for amplifying and processing the output signal of the knock sensor. The electronic network includes means for charging a storage capacitor to a potential which is a function of the amplitude of the knock sensor output signal. The storage capacitor is coupled to the input of an output amplifier via a normally closed first switch. A detector for sensing any disconnection of the knock sensor from the electronic system produces a control signal indicative of a disconnect condition. The control signal is used to open the normally closed first switch and to cause the input of the output amplifier to be clamped to a reference potential which lies outside the signal range normally produced across the storage capacitor and to cause the output of the output amplifier to be placed at a predetermined level indicative of a disconnect condition. The output of the output amplifier thus produces signals at its output which are within a predetermined range during normal operation and a signal outside of this range in response to a knock sensor disconnect condition. Thus, a single line from the output amplifier carries regular normal signals and the disconnect signal lying outside the range of the normal signals.

BRIEF DESCRIPTION OF THE DRAWINGS

In the accompanying drawings like reference characters denote like components.

DETAILED DESCRIPTION OF THE INVENTION

Figure 1:
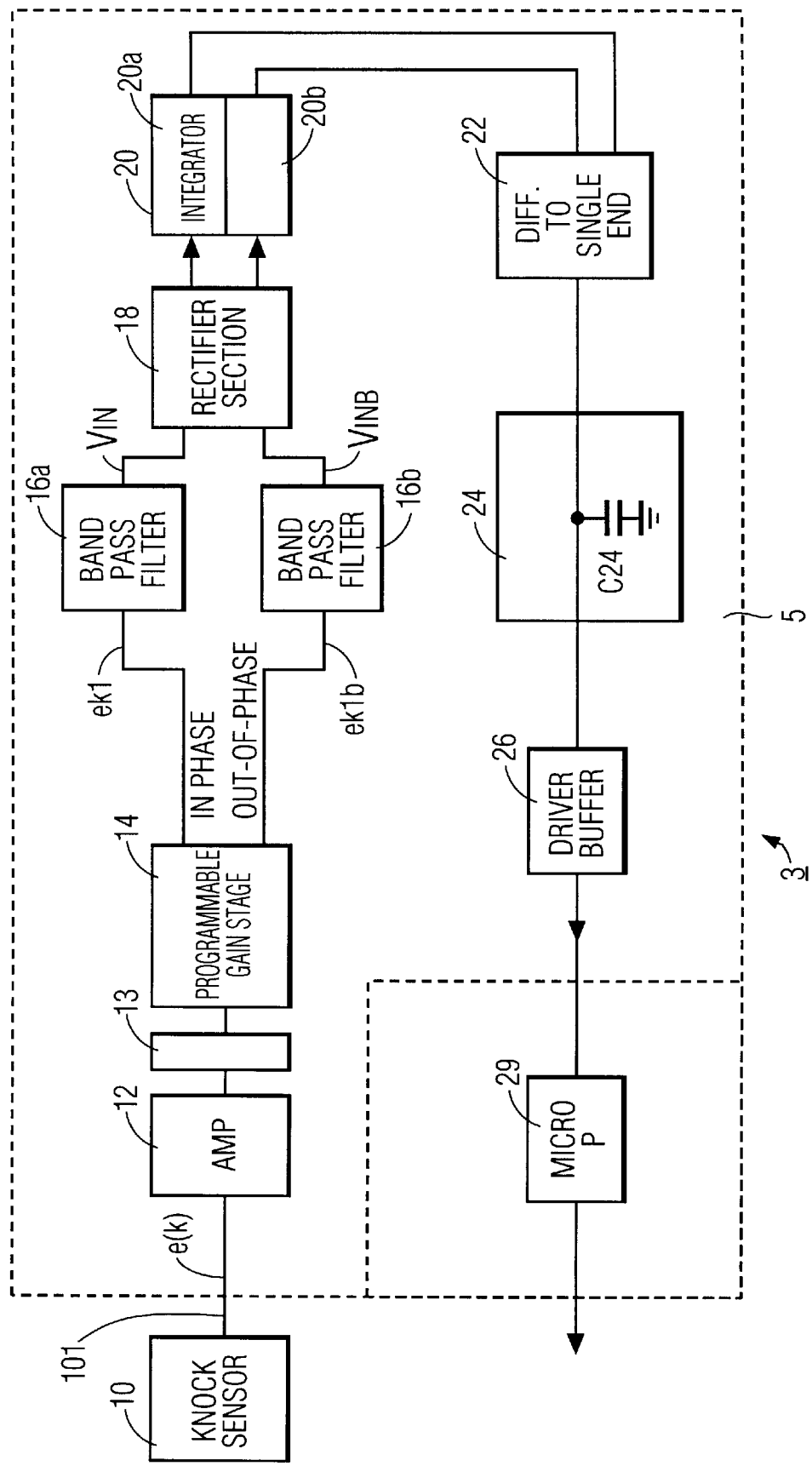
FIG. 1 is a block diagram of a prior art system.
Figure 2:
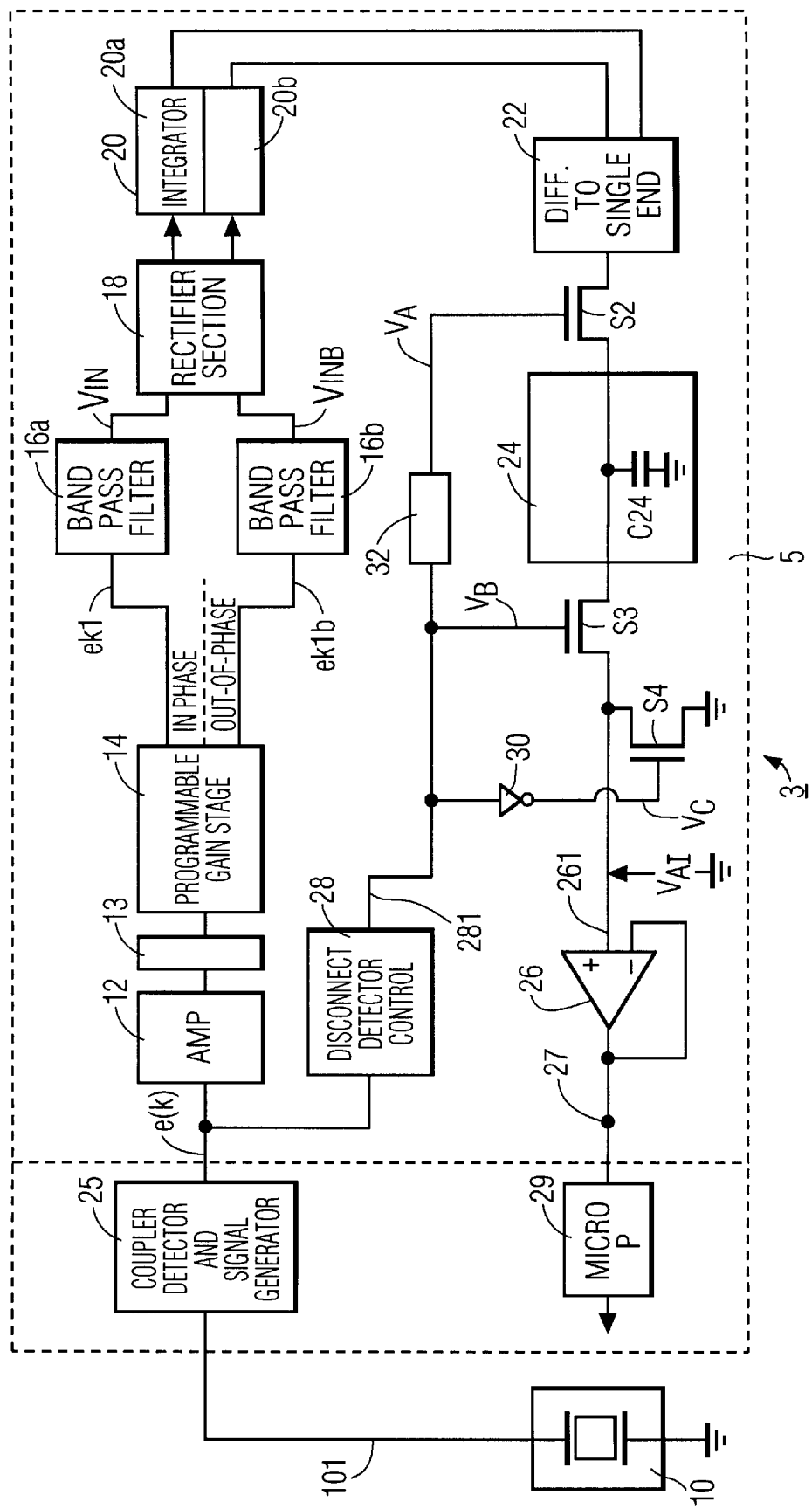
FIG. 2 is a block diagram of a knock sensor system embodying the invention.

The prior art system of FIG. 1 has been modified in accordance with the invention, as shown in FIG. 2, to detect when a disconnect condition occurs (e.g., when line 101 breaks or is disconnected whereby the knock sensor 10 no longer supplies a knock sensor signal to the amplifier 12). Thus, the circuit of FIG. 2 includes a network 25 for coupling knock sensor 10 signals to the input of amplifier 12 and additional circuitry for producing a special control signal when the knock sensor 10 is disconnected from the system.

In normal operation, the knock sensor signals lie within a certain predetermined range and are processed as described above. In the system of FIG. 2, the sensor signals are amplified and processed via amplifier 12, filter 13, gain stage 14, band pass filters 16a, 16b, rectifier section 18 and integrators 20a and 20b.

The rectifier section 18 and the integrator section 20 may be of the type used in Engine Knock Signal Processor Circuits 9010 or 9011, manufactured by Harris Corporation. Alternatively they may be of the type disclosed in previously filed patent applications titled Comparator With Small Signal Suppression Circuitry, bearing Ser. No. 08/918,345, and Electrical System With Small Signal Suppression Circuitry, bearing Ser. No. 08/918,307; both applications being assigned to the same assignee as application, and the teachings of both applications being incorporated herein by reference.

The double ended output of integrators 20a and 20b is supplied to the inputs of a differential to a single ended converter amplifier 22. In the system of FIG. 2, the outputs of the int egrators 20a, 20b are applied to differential to single ended converter amplifier 22 via a normally closed transistor switch S2 to charge capacitor C24. The capacitor 24 voltage is coupled via normally closed switch S3 to the positive (+) input terminal 261 of a buffer (o perational amplifier) 26.

In the circuit of FIG. 2, the output of converter amplifier, 22 is coupled via a switching transistor S2 to one plate of the storage (holding) capacitor C24 while its other plate is returned to ground. A transistor switch S3 is connected between the o ne plate of capacitor C24 and input terminal 261 of operational amplifier 26. A transistor switch S4 is connected between input terminal 261 of amplifier 26 and ground.

For ease of explanation in the discussion to follow, assume that the transistor switches (S2, S3, S4) are MOS transistors of N conductivity type. That is, each one of these "switching" transistors is turned-on (i.e., switch-closed) when a "high" voltage (e.g., which may be, for example, equal, or close, to +5 volts) is applied to its gate e lectrode and each one of the switching transistors is turned-off (i.e., switch-open) when a "low" voltage (e.g., which may be, for example, equal, or close, to zero volts) is applied to its gate electrode. It should be understood that the switches could instead be a mixture of N and P type MOS transistors or that each switch could comprise a pair of complementary MOS transistors (i.e., an N and a P type MOS transistor with their conduction paths connected in parallel).

Figure 3:
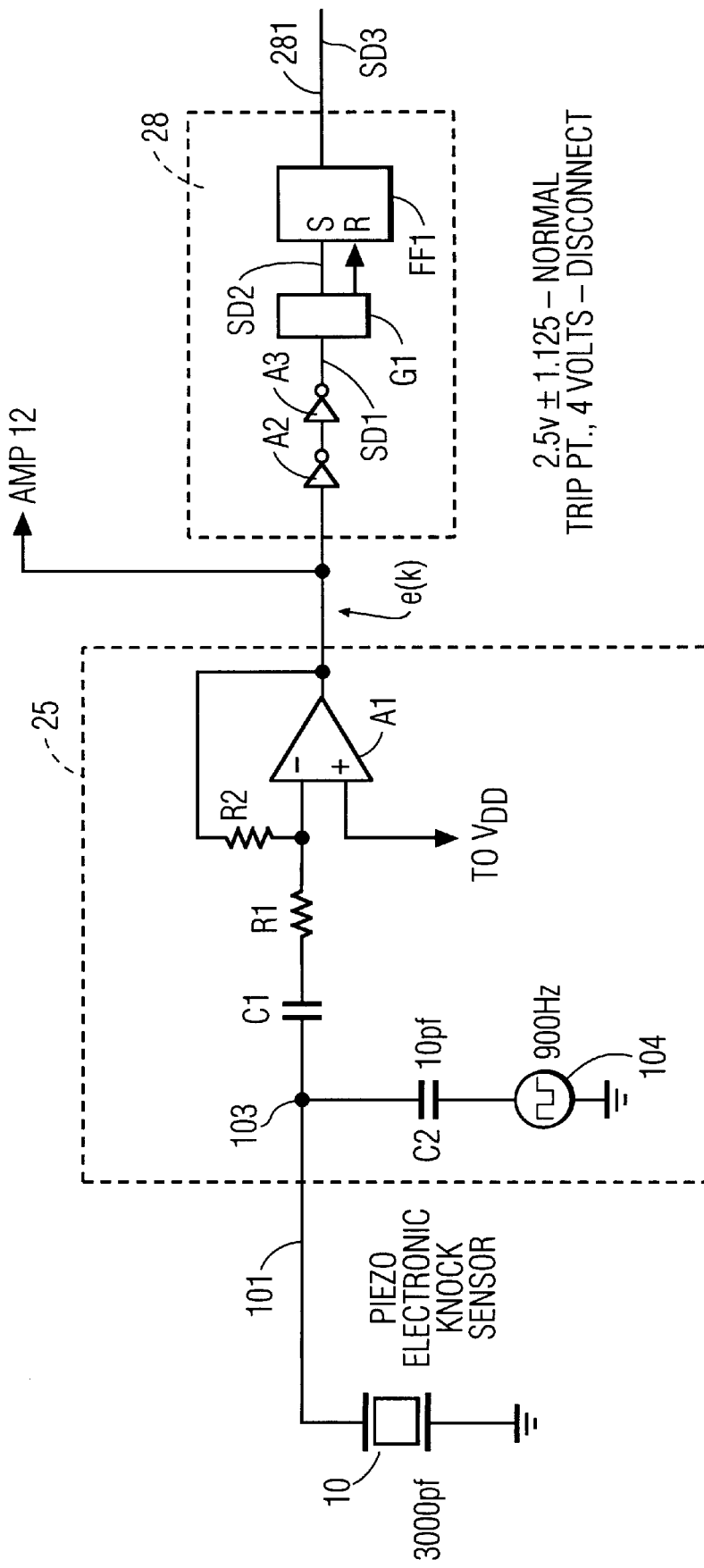
FIG. 3 is a semi-schematic, semi-block diagram of a network for producing control signals for use in the circuit of FIG. 2.

The turn-on and turn-off of switches S2, S3 and S4 is controlled by disconnect detector control circuit 28. Detector circuit 28 is driven by circuit 25 and is controlled by a signal produced at the output of circuit 25. This is best explained by reference to FIG. 3.

During normal operation, signals produced by knock sensor 10 are coupled via capacitor C1 and a resistor R1 to the negative (−) input of operational amplifier A1 whose gain is determined by the ratio of R1 and a feedback resistor R2. By way of example, under normal operating conditions, the output of amplifier A1 is held at 2.5 volts plus or minus 1.125 volts. That is, under normal operating conditions, signals e(k) at the output of A1 will range between 1.375 volts and 3.625 volts. For these range of values of the e(k) signals, the combination of inverters A2 and A3 and logic gate G1 causes FF1 to be reset such that the control voltage on line 281 is "high" (i.e., at, or close to, VDD volts).

A capacitor C2 is coupled between a node 103 and a square wave source 104 varying at a frequency (e.g, 900 Hz) which is selected to be below the knock sensor signal frequency range. By way of illustration, C2 has a capacitance of 10 picofarads (pf) and knock sensor 10 has an equivalent capacitance of approximately 3,000 pf. Thus, when knock sensor 10 is connected in circuit, the signal from source 104 appearing at node 103 is attenuated by a factor of 300 and has virtually no effect on the signal at node 103. The knock sensor signals are then propagated via C1 to amplifier A1, with negligible contribution from source 104. However, if sensor 10 is removed from the circuit (e.g., line 101 breaks), the signal generated by source 104 and coupled to node 103 is no longer attenuated by the 3000 pf from knock sensor 10. A relatively large signal from source 104 is now applied to amplifier A1 which further amplifies this signal. By way of example, it may be assumed that, for the disconnect condition, the AC signal produced at the output of amplifier A1 is equal to, or exceeds, 4 volts. It may also be assumed, that when the amplitude of e(k) exceeds 4 volts, the combination of A2, A3 and G1 is designed to set FF1 such that it produces a "low" control voltage which is at, or close to, zero volts on line 281.

Therefore, for purpose of illustration, it may be assumed that when detector circuit 28 senses a disconnect condition, its output on line 281 goes "low". Otherwise, the output of detector 28 on line 281 is normally "high". The output of detector circuit 28 is applied directly to the gate of switch S3, via an inverter 30 to the gate of switch S4 and via a non-inverting buffer 32 to the gate of switch S2. This is illustrated in FIG. 2 by the application of a voltage VB to the gate of switch S3, a voltage VC to the gate of switch S4, and a voltage VA to the gate of switch S2.

In the absence of a disconnect condition, the output of detector 28 (which may be considered a control signal) is "high", whereby voltages VA and VB are high and voltage Vc is low causing switches S2 and S3 to be turned-on and switch S4 to be turned-off. Consequently, during normal operation, the output of converter 22 is applied to and charges capacitor 24 (via S2) and the voltage on capacitor 24 is applied (via s3) to the positive (+) input of amplifier 26.

Figure 4:
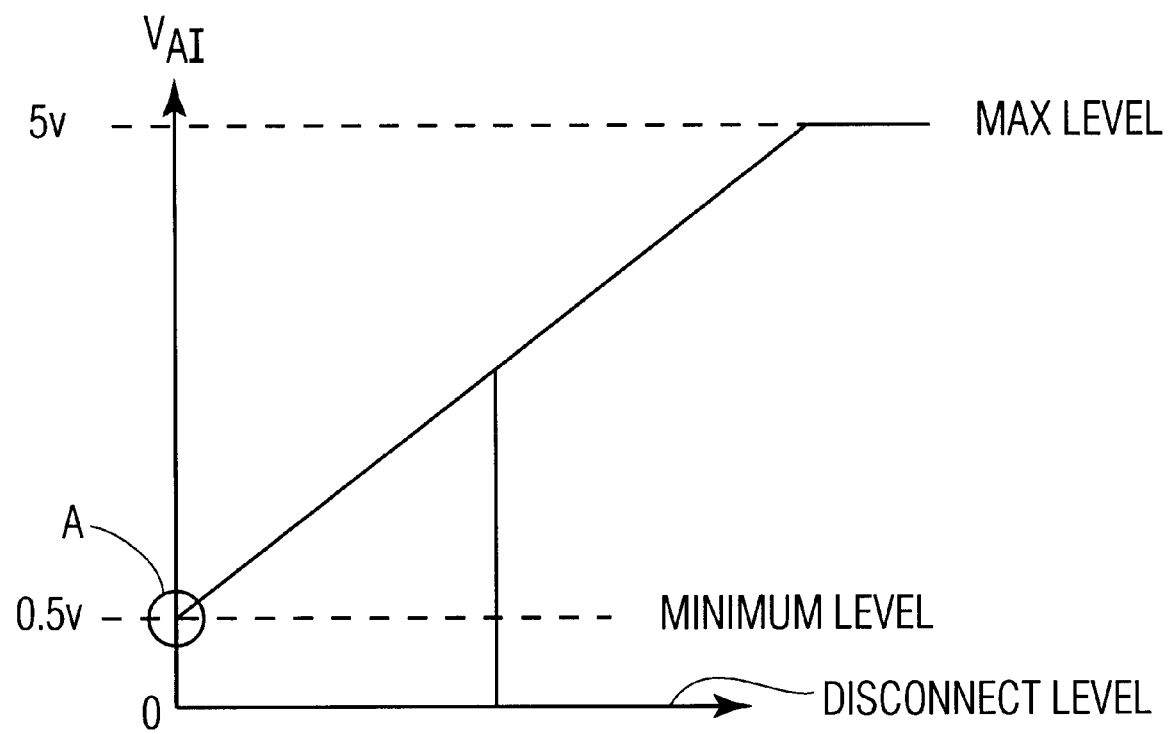
FIG. 4 is a waveform diagram of the normal signal and disconnect voltages produced in the circuit of FIG. 2.

It is important to note that in the operation of the circuit of FIG. 2, a minimum voltage of, for example, 0.5 volts is developed across capacitor C24 when there is no knock sensed in the system. This is shown in FIG. 4 as point "A". As the knocking of the engine increases, the voltage at the output of capacitor C24 can increase from a minimum of 0.5 volts to a maximum of 5 volts, as shown in FIG. 4. Therefore, the voltage (VAI) applied to the input 261 of amplifier 26 will normally be in a range between 0.5 volts and 5 volts. Also, by way of example, in the circuit of FIG. 2, amplifier 26 is a unity gain amplifier whereby the voltage at the output 27 of amplifier 26 follows the voltage on capacitor C24.

Upon sensing a disconnect condition, the output of detector 28 on line 281 goes low. This causes switches S2 and S3 to open and switch S4 to close. The opening of switch S2 disconnects the output of converter 22 from capacitor C24. The opening of switch S3 disconnects (decouples) the capacitor from input 261 of amplifier 26. The closure of switch S4 clamps input 261 of amplifier 26 to ground causing its output at 27 to also go to ground, as shown in FIG. 4. Note that in many applications it is not necessary to decouple capacitor C24 from the output of amplifier 22, in which case switch S2 is not needed and can be replaced by a short circuit. In those applications only switches S3 and S4 would be used.

Thus, when the knock sensor 10 is connected to the electronic circuit 3, amplifier 26 produces a signal at its output 27 which ranges between 0.5 volts and 5 volts; and when the knock sensor is disconnected from the circuit, amplifier 26 produces a zero volt signal which is outside the "knock signal" range. The zero volt condition produced at node 27 is applied to a microprocessor 29 which is programmed to recognize this voltage level as a fault condition. The microprocessor 29 will then process this condition preventing the engine from responding further.

In the example above, it was assumed that the "knock signal" range was between 0.5 volts and 5 volts and that the disconnect condition was at, or close to, zero volts. Alternatively, it should be noted that the normal knock signal range may be between zero volts and 4.5 volts and the disconnect condition may be a voltage level above 4.5 volts.

Alternatively, the disconnected condition may be indicated by a special code signal applied to the input of the amplifier 26 which is recognizable by the microprocessor connected to the output 27 of amplifier 26.

What is claimed is:

1. In a system including a knock sensor having an output which is coupled to an electronic network for amplifying and processing the output signal of the knock sensor, and wherein the electronic network includes means for charging a storage capacitor to a potential which is a function of the amplitude of the knock sensor output signal, and wherein the storage capacitor is coupled to an input of a buffer amplifier, the improvement comprising:

a detector for sensing any disconnection of the knock sensor from the electronic network and for producing a signal indicative of a disconnect condition; and means responsive to the signal indicating a disconnect condition for decoupling the capacitor from the input of the buffer amplifier and for clamping the input of the buffer amplifier to a reference potential to cause the buffer amplifier output to be placed at a well defined level indicative of a disconnect condition.

2. In a system as claimed in claim 1, wherein the improvement includes a first switch connected between the capacitor and the input of the buffer amplifier and a second switch connected between the input of the buffer amplifier and the reference potential; and wherein a means responsive to the signal indicative of a disconnect condition is coupled to the first and second switches to turn-off the first switch and turn-on the second switch in response to a signal indicative of a disconnect condition.

3. In a system as claimed in claim 2, wherein the entire electronic network is formed on an integrated circuit.

4. In a system as claimed in claim 1, wherein, during normal operation of the system and in the absence of a disconnect condition the potential across the storage capacitor which is applied to the input of the buffer amplifier varies in a range between first and second voltage levels, and wherein in response to said disconnect condition a third voltage outside the range of said first and second voltages is applied to the input of the buffer amplifier.

5. In a system as claimed in claim 4 wherein during normal operation the output of the buffer amplifier varies in a first range corresponding to the range between said first and second voltage levels and wherein, in response to a disconnect condition, the output of the buffer amplifier is driven to a third level corresponding to said third voltage.

6. A combination comprising:

a knock sensor having an output for producing thereat a signal whose amplitude is indicative of the amount of knock produced by an engine;

a holding capacitor;

an electronic network coupled between said knock sensor output and said holding capacitor for normally charging said capacitor to a voltage proportional to the amplitude of the signal produced by the knock sensor;

a buffer having an input and an output;

a first switch means coupled between the capacitor and the input of the buffer for selectively applying the capacitor voltage to the buffer input;

a second switch means coupled between the input of the buffer and a point of reference potential for selectively applying the reference potential to the buffer input;

detector means for sensing whenever the sensor is disconnected from the electronic network and for producing a control signal indicative of a disconnect condition; and means coupled between said detector means and said first and second switch means for disabling said first switch means and enabling said second switch means in response to a disconnect condition for applying the reference potential to the buffer input in response to said disconnect condition.

7. The combination as claimed in claim 6, wherein said electronic network includes amplifying means, band pass filter means, rectifying means and integrating means.

8. The combination as claimed in claim 6, wherein the enabling of said second switch means drives the output of said buffer to a predetermined voltage level which is outside the range in which the buffer responds to knock signals.

* * * * *